United States Patent [19]

Kightlinger et al.

[11] 4,375,535

[45] Mar. 1, 1983

[54] STABLE LIQUID, AMYLOPECTIN STARCH GRAFT COPOLYMER COMPOSITIONS

[75] Inventors: Adrian P. Kightlinger; Edwin L. Speakman; Grant T. Van Duzee, all of Clinton, Iowa

[73] Assignee: Standard Brands Incorporated, New York, N.Y.

[21] Appl. No.: 223,629

[22] Filed: Jan. 9, 1981

Related U.S. Application Data

[63] Continuation-in-part of Ser. No. 144,071, Apr. 28, 1980, abandoned.

[51] Int. Cl.$^3$ .................. C08L 3/02; D06M 15/22
[52] U.S. Cl. ............................. 527/313; 527/314; 525/54.26; 252/8.6; 8/115.6; 427/389.9
[58] Field of Search ............... 260/17.4 GC, 17.4 ST; 252/8.6; 8/115.6; 427/389.9; 527/313, 314; 525/54.26

[56] References Cited

U.S. PATENT DOCUMENTS

| | | | |
|---|---|---|---|
| 2,914,495 | 11/1959 | Gordon et al. | 260/17.4 |
| 2,922,768 | 1/1960 | Mino et al. | 260/17.4 |
| 3,061,471 | 10/1962 | Brockway et al. | 260/17.4 |
| 3,061,472 | 10/1962 | Brockway | 260/17.4 |
| 3,095,391 | 6/1963 | Brockway et al. | 260/17.4 |
| 3,138,564 | 6/1964 | Borunsky | 260/17.4 |
| 3,332,897 | 7/1967 | Chaudhuri | 260/17.4 |
| 3,377,302 | 4/1968 | Gugliemelli et al. | 260/17.4 |
| 3,669,915 | 6/1972 | Jones et al. | 260/17.4 |
| 3,770,672 | 11/1973 | Yoshizawa et al. | 260/17.4 |
| 3,984,361 | 10/1976 | Gugliemelli et al. | 260/17.4 |
| 4,029,616 | 6/1977 | Nakashio et al. | 260/17.4 |
| 4,115,332 | 9/1978 | Young et al. | 260/17.4 |
| 4,301,017 | 11/1981 | Kightlinger et al. | 252/8.6 |

FOREIGN PATENT DOCUMENTS

869501  5/1961  United Kingdom .............. 260/17.4

OTHER PUBLICATIONS

"Efficiency and Frequency of Grafting of Methyl Methacrylate to Granular Corn Starch," J. Polymer Sci.: Part A, vol. 2, pp. 3721–3731, 1964, C. E. Brockway.

"Grafting of Poly(vinyl acetate) to Granular Corn Starch," C. E. Brockway, Amer. Chem. Soc. Div. Org. Coatings Plast. Chem. Prepr.: 2, pp. 502–508, 1967.

"Block and Graft Copolymerization," vol. 1, pp. 2–4, Ed. R. J. Ceresa, John Wiley and Sons, New York, 1973.

Hackh's Chemical Dictionary, 4th Ed., (1969), p. 634.

Ency. of Polymer Sci. and Tech., vol. 12, (1970), pp. 800, 801, 805, 807–808, 820, 821, 823 and 824.

Corn Starch, 4th Ed., (1979), Corn Refiners Assoc., Inc., Washington, D.C., pp. 8, 9, 13, 14, 15, 19 and 20.

Corn Starch, Corn Industries Foundation, 2nd Ed., (1955), pp. 10, 11, 19, 20, 42–44.

Chemistry and Industry of Starch, 2nd Ed., (1950), p. 191.

Primary Examiner—John Kight, III
Assistant Examiner—Nathan M. Nutter
Attorney, Agent, or Firm—Richard Kornutik

[57] ABSTRACT

This invention relates to stable, aqueous polymeric dispersions comprised of graft copolymers of at least one vinyl monomer and a derivatized and thinned amylopectin starch, that is, a starch wherein the starch is made up entirely or almost entirely of amylopectin units such as waxy maize starch. The amylopectin starch is derivatized to a degree of substitution of at least about 0.01 and thinned to an intrinsic viscosity of not less than about 0.12 deciliters per gram. The graft copolymers have a starch/monomer ratio of less than about 100/25 by weight. The dispersions have high solids contents (25% by weight or greater) and are stable (show no excessive increase in viscosity and remain homogeneous) over extended periods of time. This invention also relates to processes for the production of the dispersions.

36 Claims, No Drawings

100
4,375,535

STABLE LIQUID, AMYLOPECTIN STARCH GRAFT COPOLYMER COMPOSITIONS

This application is a continuation-in-part of application Ser. No. 144,071, filed Apr. 28, 1980, now abandoned.

BACKGROUND OF THE INVENTION

Field of the Invention

This invention relates to aqueous polymeric dispersions comprised of graft copolymers of amylopectin starch and vinyl monomers. These compositions have high solids contents (25% by weight or greater) and are stable (show no excessive increase in viscosity and remain homogeneous) over extended periods of time. This invention also relates to processes for the production of the compositions.

Initiators for Graft Polymerization

The production of graft copolymers of starch and vinyl monomers initiated by inducing free radicals on a starch is well known. Reviews have been published by J. C. Arthur, Jr. (*Advances in Macromolecular Chemistry*, Vol. 2, Academic Press, London & New York, pp. 1–87, 1970) and by G. F. Fanta (*Block and Graft Copolymers*, Vol. 1, John Wiley & Sons, London & New York, pp. 1–45, 1973).

A number of chemical activators are known. U.S. Pat. No. 3,138,564 to Borunsky discloses graft polymerization of 1,3 butadiene and acrylonitrile to starch using ozone and Fe(II). British Pat. No. 869,501 discloses the production of starch graft polymers utilizing polymerization initiators such as hydrogen peroxide, organic peroxides, hydroperoxides and dilute solutions of ceric ions. Yields may be improved by the use of an activator for these initiators such as mild reducing agents, e.g., ferrous ammonium sulfate, sodium formaldehyde sulphoxylate and the like. C. E. Brockway (*Am. Chem. Soc. Div. Org. Coatings Plast. Chem.*, pp. 502–508, 1967) and U.S. Pat. Nos. 3,061,471 to Brockway et al. and 3,061,472 to Brockway disclose the use of hydrogen peroxide to graft polymerize various vinyl monomers onto starch. Additionally, C. E. Brockway (*J. Polymer Sci.*: Part A, Vol. 2, pp 3721–3731, 1964) discloses use of hydrogen peroxide to graft polymerize methyl methacrylate to starch. For the most part these initiators are nonspecific and induce homopolymerization of single monomers and copolymerization of monomer mixtures as well as the desired graft polymerization of monomer and monomer mixtures to the starch. This produces products which tend to separate on storage.

Such problems can be minimized or avoided by the use of a Cerium(IV) initiator. Although some homopolymerization has been reported using Cerium(IV) by Fanta, et al. (*J. Appl. Polymer Sci.*, Vol. 10, pp. 919–937, 1966) the most important pathway for Cerium(IV) initiation of free radicals as outlined by Fanta (Block and Graft Copolymers, Vol. 1, p. 3, Ed. R. J. Ceresa, John Wiley & Sons, London & New York, 1973) would be expected to give graft copolymers to the exclusion of any homo- or copolymers. Extensive use has been made of this system to graft vinyl monomers to starch.

Starches and Monomers

Brockway et al. in U.S. Pat. No. 3,061,471 and Brockway, U.S. Pat. No. 3,061,472 discuss the graft copolymerization of "thin boiling starch." Brockway uses "starch" in the generic sense to include the various native starches such as corn, potato, waxy maize, tapioca, rice, wheat, etc., the dextrins and the various available modifications and derivatives. In these patents "thin boiling" designates starch products, whether modifications of native starch or derivatives, which when gelatinized produce pastes that are less viscous, cohesive and tacky and tend to gel less than the native starch. Brockway exemplifies these by such starches as the hypochlorite oxidized, the acid-modified, the enzyme converted and the ethers and acetates. The products obtained by polymerization with acrylic acid esters of alkanols are useful as sizes for hydrophobic fibers. U.S. Pat. No. 3,095,391 to Brockway et al. teaches the use of granular unpasted starch, granular hypochlorite-oxidized starch, acid modified granular starch prepared by heating an acidified aqueous suspension of granular starch below the pasting temperature, granular starch reacted with ethylene oxide, and granular starch reacted with vinyl acetate as suitable materials for polymerization with vinyl monomers including vinyl acetate, ethyl acrylate, styrene, methacrylic acid, the butyl esters of acrylic and methacrylic acids, methyl methacrylate, acrylonitrile, acrylamide, 4-vinyl pyridine and diethylaminoethyl methacrylate. The products have utility as adhesives, flocculants and sizes.

Graft Copolymer Compositions

The graft copolymerization reactions are usually carried out in aqueous media with the resulting compositions being obtained as aqueous dispersions or latices. Since the valuable and useful portion of such a latex is the graft copolymer portion of the dispersion it is desirable that the compositions be prepared at the highest practicable solids level. Furthermore, if the latices are to have any useful life they must be stable. That is, the dispersions should not separate into two or more phases or undergo any excessive increase in viscosity within the periods required for commercial usage. Such problems when producing polymer compositions from the previously known starches have been noted in U.S. Pat. No. 3,984,361 where gelatinized cationic starches polymerized with a vinyl monomer to form aqueous dispersions are stabilized by sonification and in U.S. Pat. No. 4,029,616 where aqueous dispersions of pullulan polymerized with an ethylenic compound are distinguished from those based on starch by exhibiting stability and not undergoing gelation or "aging."

SUMMARY OF THE INVENTION

The compositions of this invention are stable aqueous dispersions, which remain homogeneous and liquid for a period of at least 60 days at normal storage temperatures, comprised of at least 25% solids by weight of an amylopectin starch graft copolymer of at least one vinyl monomer and a derivatized and thinned amylopectin starch with a degree of substitution of at least about 0.01 and an intrinsic viscosity of not less than about 0.12 deciliters per gram (dl/g) wherein the starch/monomer ratio of the graft copolymer is less than about 100/25 by weight, dry solids.

The term "amylopectin starch" is intended to include starches consisting entirely or almost entirely of amylopectin. Such starches are exemplified by the starches obtained from waxy grains such as waxy maize, waxy sorghum, waxy barley and waxy rice or by starch fractions wherein the starch is made up entirely or almost entirely of amylopectin.

The amylopectin starch graft copolymer compositions thus described do not have the problems of phase separation, undue increase in viscosity upon storage, and gelation inherent in those produced by prior processes. The nature of the compositions is such that they are readily diluted to the desired solids levels. Consequently, the high solids content of these compositions adds considerable commercial value to them since problems associated with storage and transportation of unnecessary amounts of water are greatly reduced.

UTILITY

The stable dispersions of the invention can be used as sizing agents for hydrophobic fibers, and as coatings and adhesives for paper products, and as an ingredient in coatings such as paints. Other useful applications will be apparent from the foregoing descriptions of known starch graft copolymers and their uses.

OBJECTS OF THE INVENTION

It is an object of this invention to provide amylopectin starch graft copolymer dispersions which remain liquid and show no excessive increase in viscosity under normal conditions of storage.

It is a further object of this invention to provide such starch graft copolymer dispersions at high solids contents.

A still further object of this invention is to provide processes for the production of the starch graft copolymer dispersions described.

Additional objects will be apparent from the following description and claims.

DETAILED DESCRIPTION OF THE INVENTION

Preparation of the novel amylopectin starch graft copolymer dispersions requires that the starch be derivatized, and thinned, followed by graft polymerization of a vinyl monomer or monomers initiated by a free radical initiator which acts to initiate polymerization onto the starch to the substantial exclusion of the initiation of homo- or copolymers of the vinyl monomer or monomers.

For optimum results in the preparation of stable aqueous amylopectin starch graft copolymer dispersions the starch should be free of substances which interfere with the graft polymerization reaction or adversely affect the final dispersion. The derivatization step may introduce reagents, salts or by-products which have such effects. Such substances can readily be removed by washing the derivatized amylopectin starch provided that the starch remains in granular form. Minor degrees of solubility can be tolerated in the granular starch since these are readily repressed by the addition of a water miscible organic liquid, such as ethyl alcohol, to the wash water.

The amylopectin starch can be thinned by chemical means such as acid hydrolysis followed by derivatization while keeping the starch in granular form. Likewise, the starch may first be derivatized and the granular product thereafter gelatinized and thinned. A combination of acid and enzyme thinning may also be employed. When derivatization is the first step it is preferred that thinning be done by enzymatic means. This sequence is the preferred method of preparing the derivatized and thinned starches.

A further consideration is that the derivatized starch should be readily gelatinized and dispersed in water to facilitate the subsequent polymerization reaction.

Also, since the viscosity of the thinned derivative affects the viscosity of the final amylopectin starch graft copolymer dispersion the viscosity of the starch derivative should be selected to keep the viscosity of the final dispersion consistent with its desired solids content. Waxy maize starch is the preferred amylopectin starch.

Preparation of the Starch Derivatives

The preparation of starch derivatives is well known. However, we have found that to produce amylopectin starch derivatives with the properties which lead to stable dispersions upon graft polymerization with vinyl monomers it is necessary to control the degree of substitution. The type of substituent also has an effect in the stability of the dispersions. Likewise, it is necessary to control the degree of thinning of the starches if optimum physical properties, such as tensile strength and abrasion resistance, of the copolymers are to be achieved.

Degree of Substitution

At the same degree of substitution bulky and charged substituents on the starch tend to provide relatively more stable dispersions than small or uncharged substituents. Any substituent which does not interfere with polymerization and which provides starch derivatives exhibiting stable viscosities at solids levels of about 30% to 45% by weight after thinning is a suitable substituent. These include anionic, cationic and non-ionic substituents. The preferred substituents are of the cationic and non-ionic types. Carbamylethyl, alkyl, benzyl and benzalkyl starch derivatives are exemplary of the non-ionic derivatives. The dialkylaminoalkyl substituent exemplifies the cationic derivatives.

The preferred starch derivatives are those with hydroxyalkyl, cyanoalkyl, dialkylaminoethyl, and acyl substituents. The most preferred are the hydroxyethyl, cyanoethyl, diethylaminoethyl, carbamylethyl and acetyl derivatives.

The degree of substitution chosen will affect the rate of change in viscosity of the dispersion produced by graft polymerization. With higher degrees of substitution dispersions which do not double in viscosity in 30 months can be prepared. However, most industrial applications do not require such extremely stable latices. The practical considerations are that the final dispersions should not become so viscous that they are difficult to handle or must be thinned, to a solids level too low for the intended use. The initial viscosity of the polymeric dispersion will depend upon the initial viscosity of the starch dispersion and this viscosity is related to the solids content of the starch dispersion. Increasing solids content increases the initial viscosity of the polymeric dispersion. Consequently, if a low solids content is adequate for the intended use the polymeric dispersion may be prepared at low solids content and consequent low initial viscosity thereby permitting greater increases in viscosity during storage without becoming unduly viscous.

The increase in stability of the final dispersion is not proportional to the degree of substitution of the starch. At zero degree of substitution amylopectin starch as exemplified by waxy maize starch graft copolymer dispersions are unstable and exhibit large increases in viscosity in relatively short periods of time. For example, graft copolymer dispersions based on unsubstituted waxy maize starch exhibit an increase in viscosity as great as 300% of the initial viscosity in less than 60 days. Such extreme and progressive changes in viscosity make dispersions derived from unsubstituted amylopectin starch unsuitable for commercial transport and storage.

In contrast to the instability of starch graft copolymers based on unsubstituted waxy maize starch a sharp and unsuspected improvement in stability appears above a critical, minimum degree of substitution. This minimum degree of substitution varies to some degree with the type of substituent but this marked change in stability appears at a degree of substitution of about 0.01. This improvement in stability is seen at somewhat lower degrees of substitution when a bulky and/or charged radical such as the diethylaminoethyl radical is the substituent. Slightly higher degrees of substitution of the carbamylethyl radical show this improvement in stability. The effects on stability of the cyanoethyl and acetyl radicals are intermediate to the effects of the diethylaminoethyl radical and the carbamylethyl radicals. At a degree of substitution of at least about 0.01 the aqueous amylopectin starch graft copolymer dispersions show no more than about a 100% increase in viscosity over a two month period under normal storage conditions. The preferred range of degree of substitution, within which the dispersions show no substantial increase in viscosity over a two month period, is from about 0.02 to about 0.4. The range of degree of substitution from about 0.06 to about 0.2 is especially preferred.

Thinning of the Derivatized Starch

Thinning may be accomplished by known means such as acid hydrolysis or enzyme treatment. Thinning by enzymatic means such as use of alpha-amylase is preferred.

The degree of thinning of the starch, as determined by the intrinsic viscosity, is an important aspect of this invention, since it determines the initial viscosity of the starch graft copolymer dispersion, all other factors being equal. As a rule of thumb, the final starch graft copolymer dispersion will have an initial viscosity roughly 2 to 4 times that of the thinned starch derivative. The degree of thinning also affects the tensile properties of the products, which properties are an important consideration in such uses as paper coatings and textile sizes. These properties become much diminished when the intrinsic viscosity of the thinned starch falls below about 0.12 dl/g. There is no upper limit on the intrinsic viscosity other than that imposed by the necessity for obtaining a good dispersion and adequate mixing during the polymerization reaction. As is well-known, these factors are also a function of the equipment in which the polymerization reaction is conducted. A further factor, as previously discussed, is the initial viscosity of the intended product. Some thinning is, however, required to produce satisfactory products at the 25% and greater total solids levels contemplated by this invention.

The preferred range of intrinsic viscosity of the thinned amylopectin starches if from about 0.12 to about 0.28 dl/g. For optimum tensile properties of the graft copolymers the range of intrinsic viscosities from about 0.13 to about 0.21 dl/g is especially preferred.

Use of Derivatized Amylopectin Starch to Prepare Stable Aqueous Dispersions of Graft Copolymers Monomers Any monomer polymerizable onto the derivatized and thinned amylopectin starch through a free radical initiated reaction may be used to produce the starch graft copolymers. The monomer or combination of monomers should be chosen so that the amylopectin starch graft copolymer dispersion produced comprises water insoluble graft copolymer particles dispersed in an aqueous continuous phase. In general these are vinyl monomers such as vinyl halides, vinyl esters, vinyl ethers, alkylvinyl ketones, N-vinyl carbazole, N-vinyl pyrrolidone, vinyl pyridene, styrene, alkyl styrenes, acrylic acid, alkyl acrylates, methacrylic acid, alkyl methacrylates, acrylamide, substituted acrylamides, vinylidene halides, itaconic acid, 1-3 butadiene and the like. Among these, acrylonitrile, methyl methacrylate, vinyl acetate, 2-ethylhexyl acrylate, and the lower alkyl acrylates such as methyl acrylate, ethyl acrylate and butyl acrylate are preferred when a single monomer is used to form the graft copolymer.

The especially preferred single monomers used to produce the amylopectin starch graft copolymers are methyl acrylate, ethyl acrylate and methyl methacrylate.

As is well known, combinations of two or more monomers can be polymerized together to form copolymers or block copolymers and such combinations can also be used to produce amylopectin starch graft copolymers with the derivatized and thinned starches. When two or more monomers are polymerized with the derivatized and thinned amylopectin starch the preferred monomers are dimethylaminoethyl methacrylate, ethyl acrylate, butyl acrylate, methacrylate acid and methyl methacrylate.

Polymerization Initiators

Any polymerization initiator that acts to initiate free radical polymerization on the derivatized and thinned amylopectin starch to the substantial exclusion of initiation of homo- or copolymerization of the monomer or mixture of monomers utilized to form the starch graft copolymer is a suitable initiator.

Ceric ammonium nitrate is an example of such an initiator. This initiator may be used in amounts from about 0.5% to 8% by weight of the derivatized and thinned starch. Amounts below about 0.5% do not provide adequate initiation of the graft polymerization and are apt to result in sizeable amounts of unreacted monomer. Initiator levels from about 1.4% to 4% by weight of the starch are preferred.

The combination of hydrogen peroxide and acetate ion also is a useful initiator. Sodium acetate or glacial acetic acid may be used to supply the acetate ion. This initiator may be used at a pH in the range from about 2 to about 9 and at initiating temperatures of about 40° to 90° C. The mole ratio of acetic acid to hydrogen peroxide is about 2 and the amount of peroxide from about 0.5% to 2.0% based on the weight of the starch.

Polymerization

The amounts of monomer or monomers added will vary according to the properties desired in the final dispersion. The dispersions of this invention have a solids content of at least 25% by weight, dry basis and, preferably, at least 40% by weight, dry basis. The starch/monomer ratio may be about 100/25 by weight or less, dry basis and preferably is about 100/40 or less. The lower limit of this ratio is a matter of choice depending upon economic considerations and the intended viscosity of the final dispersion. As increasing amounts of monomer are incorporated in the dispersions the economic advantages of using the derivatized and thinned amylopectin starch as a significant portion of the final copolymer are diminished.

In general, the amylopectin starch/monomer ratio should be less than about 100/25. The preferred starch/monomer ratio is in the range from about 100/40 to about 100/200 by weight, dry basis. The especially preferred amylopectin starch/monomer ratio is in the range from about 100/40 to about 100/100 by weight, dry basis.

The initial polymerization conditions should provide sufficient monomer to support the polymerization once it is initiated. This is readily accomplished in a conventional batch process where the monomer or monomers are added in a single increment. However, any mode of addition which will adequately utilize the initially generated free radicals without causing undue problems in temperature control will suffice, that is, the monomer or monomers may be added as a single increment, incrementally over the time of polymerization or continuously so long as the required conditions for polymerization are achieved. When mixtures of monomers are used they may be added as such to produce the conventional type of copolymer chain grafted onto the starch or may be added sequentially, individually or as discrete mixtures, to produce block copolymers grafted onto the starch.

The temperature at which the polymerization is carried out will depend upon the monomer system and catalyst used. Heating or cooling or a combination thereof may be required to achieve or maintain the desired polymerization temperature. Temperatures in the range from 0° to 100° C. may be utilized depending upon the catalyst and monomer system. Temperatures in the range from 25° to 80° C. are preferred. However, if a catalyst produces or requires a low pH prolonged exposure to such acidic conditions may result in excessive hydrolysis of the starch and adversely affect the properties of the final polymer.

Surfactants may be used to stabilize the dispersions during the polymerization or they may be added after the reaction is complete. When present during the polymerization the surfacant chosen should not interfere with the initiator system or otherwise adversely affect the polymerization reaction. Triton X-200 and Triton X-405 (Rohm and Haas Co.) are examples of surfactants that do not interfere with the polymerization reaction when the initiator is a cerium compound.

Coatings

The starch graft copolymer dispersions of this invention may advantageously be used in coatings such as paper coatings, water-based paints and the like. All common fillers such as clays, calcium carbonate, titanium dioxide and similar materials as well as pigments are compatible with the dispersions. Excessively cationic dispersions may flocculate the fillers. Since 50% or more of the adhesive element of these dispersions may be derived from starch, the use of these dispersions provides distinct economic advantages as well as conserving expensive monomers derived from increasingly scarce fossil hydrocarbons. Moreover, the relatively high viscosity of the dispersions enables the fomulation of coatings without the addition of thickeners.

Sizing Textile Yarns

The starch copolymer dispersions of this invention may be applied by conventional means to textile yarns to size the yarns in order to reduce yarn breakage during subsequent processing. When the dispersions are used as sizes it is desirable that the derivatized and thinned starches used to make the dispersions have an intrinsic viscosity in the range from about 0.12 to 0.28 dl/g. A starch graft copolymer dispersion where the starch used to make the graft copolymer has been thinned to an intrinsic viscosity in the range from about 0.13 to 0.21 dl/g is preferred when the dispersion is to be applied to textile yarns as a size.

The following examples are illustrative of the invention and not intended to limit the scope of the invention or the ambit of the claims. Unless otherwise designated, viscosities have been determined at 24° C. with a Model H.A.T. Brookfield viscometer and the appropriate spindle. Also, all percentages are based on the weight of the starch, dry basis.

Furthermore, unless otherwise designated, the term "solids" as used herein refers to total dry substance including the amylopectin starch and, where appropriate, any monomer(s) utilized to produce the starch graft copolymer dispersion. Viscosities given in centipoise (cps), unless otherwise indicated, have been determined at 24° C. using a model H.A.T. Brookfield viscometer and the appropriate spindle. Expressions and procedures used in the specifications and claims follow:

Activity of Soluble Alpha Amylase

The activity of soluble alpha amylase preparations was determined by a modification of Standard Test Method, AATCC 103, 1965 "Bacterial Alpha Amylase Enzymes Used in Desizing, Assay of" published in the 1967 Edition of Technical Manual of the American Association of Textile Chemists and Colorists, Vol. 43, pp. B-174 and B-175. The method was modified as follows: the buffer solution for the starch substrate was prepared by dissolving 25.3 g of c.p. sodium hydroxide and 340 g of c.p. potassium dihydrogen phosphate in water and diluting the solution to 2 liters; 125 ml of the buffer solution was added to the cooled, pasted starch substrate before the substrate was brought to the 500 ml volume; the pH of the starch substrate was determined and, if necessary, adjusted to 6.20±0.05; and a 0.025 molar calcium chloride solution, prepared by dissolving 11.1 g of anhydrous c.p. calcium chloride in water and bringing the volume to 4 liters, was used for enzyme sample dilutions. Results were converted to liquifons where one Bacterial Amylase Unit equals 2.85 liquifons.

Intrinsic Viscosity

The intrinsic viscosities of the derivatized and thinned amylopectin starches were derived from the intrinsic viscosities of corn starches derivatized and thinned under equivalent conditions. Intrinsic viscosity measurements were made on a number of 32% corn starch pastes previously liquified and thinned to Brookfield viscosities ranging from 40 cps to 30,800 cps. Measures of Reduced Viscosity were first obtained at five dilutions (0.5 g/100 ml, 1.0 g/100 ml, 1.5 g/100 ml, 2.0 g/100 ml and 2.5 g/100 ml) of each sample according to the procedures of Myers and Smith "Methods in Carbohydrate Chemistry," Volume IV, page 124–127, edited by R. L. Whistler, Academic Press, New York, 1964. Intrinsic viscosity values were then derived by extrapolating the reduced viscosity values obtained at the five dilutions to zero concentration.

The following formulas were used to calculate the reduced viscosity values. In these formulas $t_o$=flow time in the Cannon-Ubbelohde viscometer for pure solvent (1.00 M NaOH Solution), t=flow time in the Cannon-Ubbelohde viscometer for the diluted starch solution made 1.00 M with respect to NaOH and C=concentration of the diluted starch in grams per 100 ml.

$$\text{Specific viscosity} = n_{sp} = \frac{t - t_o}{t_o}$$

-continued $$\text{Reduced viscosity} = n_{red} = \frac{n_{sp}}{C}$$

Kjeldahl Nitrogen Analysis

Kjeldahl analyses for nitrogen were done using the standard Analytical Method of the Corn Refiners Association, Number B-48.

Degree of Substitution

The degree of substitution (D of S) was determined using the following formula:

$$D \text{ of } S = \frac{(162)(\% \text{ Nitrogen})}{(100)(14) - (A)(\% \text{ Nitrogen})}$$

$A$ = Molecular weight of the nitrogen-containing radical minus one

Cyanoethyl, $A = 53$

The production of stable aqueous amylopectin starch graft copolymer dispersions is illustrated in the following examples utilizing waxy maize starch as a prototype amylopectin starch. As will be understood by those skilled in the art, other starches with similar amylopectin content such as waxy sorghum starch, waxy rice starch, waxy barley starch and starch fractions wherein the starch is made up entirely or almost entirely of amylopectin may be utilized instead of waxy maize starch with similar results.

EXAMPLE I

A. Preparation of Cyanoethyl Waxy Maize Corn Starch Derivatives

To 10 liters of commercial (A. E. Staley Mfg. Co.) waxy maize corn starch slurry (40.87% dry substance starch by weight) were added 10% anhydrous sodium sulfate (% based on the dry substance starch) and 590 ml of caustic salt solution (a solution of sodium hydroxide and sodium chloride having 1.65 equivalents of titratable caustic per liter and a density of 27° Baume at 20° C.). The slurry alkalinity (ml of 0.1 N HCl required to neutralize 30 ml of slurry) was 24.0. To each of six 2-quart jars was added 1584 ml of the slurry (equivalent to 728 g of dry substance starch per jar). The jars, equipped with stirrers and ports for addition of reagents, were placed in a water bath (in a hood) set for 45° C. The appropriate quantity of acrylonitrile was added to each jar as presented in the table below. After 16 hours of reaction time the mixtures were adjusted to pH 6.3, filtered and washed twice and dried at about 83° C. Each sample was analyzed for Kjeldahl nitrogen and from the nitrogen value (less 0.04%) the degree of substitutions of cyanoethyl groups was calculated.

|  | A-1 | A-2 | A-3 | A-4 | A-5 | A-6 |
|---|---|---|---|---|---|---|
| Acrylonitrile Used (% based on dry substance starch) | 1.0 | 2.5 | 3.0 | 3.5 | 4.0 | 6.0 |
| Nitrogen Analysis (% N) | 0.186 | 0.500 | 0.648 | 0.691 | 0.814 | 1.23 |
| Calculated Degree of Substitution | 0.022 | 0.059 | 0.077 | 0.082 | 0.097 | 0.149 |

The cyanoethyl corn starch derivatives were enzyme thinned and graft polymerized and the viscosity stability of the resulting products was determined.

B. Enzyme Thinning and Graft Polymerization

The following procedure was used to prepare graft copolymers of each of the samples in A.

Into a 2-liter resin kettle equipped with an agitator, a thermometer, a reflux condenser, and a nitrogen gas dispersion tube were placed 650 g deionized water then 350 g (dry basis) derivatized waxy maize starch, to give a 35% starch slurry. The pH was adjusted to 7.5–7.8, followed by the addition of 4350 liquefons of alphaamylase activity derived from *B. subtilis*. The slurry was heated to 78° C. over a forty-five minute period and held at 78° C. until the viscosity of the gelatinized starch was approximately 200 cps (24° C. Brookfield, No. 2 Spindle, 20 rpm), which corresponds to an intrinsic viscosity of about 0.16 dl/g. The enzyme was inactivated by heating to 96° C. and the liquefied starch cooled to approximately 60° C. At a temperature not greater than 60° C., a nitrogen sparge was started and 12.5 g Triton (as received) X-200 surfactant was added, followed by the addition of 278.5 g ethyl acrylate. At a temperature of 48°–52° C., 6.13 g ceric ammonium nitrate dissolved in 15 g of deionized water was added. After the exothermic reaction subsided (approximately 20° C. temperature increase) the reaction temperature was maintained at 75° C. for three hours. Then 0.5 g each of ammonium persulfate and sodium metabisulfite was added to the reaction mixture to reduce the level of unreacted monomer. The mixture was maintained at 75° C. for an additional one hour period, cooled to room temperature and the pH adjusted to 8.5 with 28 percent ammonium hydroxide. The final preparations had a solids content of approximately 45.0%.

The following table summarizes the data obtained on viscosity stability of the samples.

| D of S Elapsed time (days) | \multicolumn{7}{c}{Change from Initial Viscosity (Percent)} | | | | | | |
|---|---|---|---|---|---|---|---|
|  | 0 | 0.022 | 0.059 | 0.077 | 0.082 | 0.097 | 0.149 |
| 6 | −7.1 | −5.5 | −16.1 | −9.6 | −12.7 | −9.9 | −19.4 |
| 9 |  | 6.5 | −16.1 |  |  |  |  |
| 10 | 0.0 |  |  | −10.4 | −14.1 |  |  |
| 11 |  |  |  |  |  | −14.5 | −25.0 |
| 17 | 16.1 |  |  |  |  |  |  |
| 18 |  |  |  | −7.8 | −12.7 |  |  |
| 19 |  | 0.0 | −14.8 |  |  | −12.2 | −23.4 |
| 29 | 105 |  |  |  |  |  |  |
| 30 |  | 5.5 | −16.1 |  |  |  |  |
| 31 |  |  |  | −7.8 | −12.0 |  |  |
| 32 |  |  |  |  |  | −14.5 | −22.5 |
| 47 | 300 |  |  |  |  |  |  |

-continued

| D of S Elapsed time (days) | Change from Initial Viscosity (Percent) | | | | | | |
|---|---|---|---|---|---|---|---|
| | 0 | 0.022 | 0.059 | 0.077 | 0.082 | 0.097 | 0.149 |
| 60 | | 32.0 | −8.1 | −4.3 | −4.9 | −12.2 | −18.8 |

EXAMPLE II

This Example illustrates the preparation of starch graft copolymers according to the method disclosed in U.S. Pat. No. 3,061,472. The teachings of Example I of U.S. Pat. No. 3,061,472 were followed except that Igepal CO-887 was used in place of Igepal CO-630 and the appropriate amount of 29% hydrogen peroxide was used instead of 50% hydrogen peroxide. The teachings were followed to prepare products at 16%, 25%, 30% and 48% solids as follows.

A. 16% Solids

A starch paste was prepared by stirring 67.5 g of a commercial corn starch oxidized with sodium hypochlorite containing about 1.0% carboxyl groups in 143 g of water and heating at 98°–99° C. for 30 minutes. While the paste was cooling 613.5 g of water were added. To this mixture were added 1.0 g of glacial acetic acid, 0.30 g of ferrous ammonium sulfate and 9.4 g of Igepal CO-887 (a 70% solution of a nonylphenoxy ether of polyoxyethylene having on the average 30 oxyethylene groups per molecule). Igepal CO-887 was listed as a preferred surfactant in Table 1 of Example 3 of U.S. Pat. No. 3,061,472. The paste was cooled to 48° C. and 67.5 g of ethyl acrylate were added followed by the addition of 1.55 g of hydrogen peroxide. Within a few seconds the temperature of the reaction mixture began to rise. The temperature was then adjusted to and held at 60° C. for three hours. During this time the reaction mixture was subjected to constant, vigorous agitation. After these three hours the product was cooled to room temperature. The viscosity of this product was 1380 cps at 24° C.

B. 25% Solids

The procedure of A was repeated but with total solids content increased to 25% by reducing the total quantity of water to 410 g. The product was a soft gel with a viscosity greater than 13,000 cps at 24° C.

C. 30% Solids

Using the procedure in A, above, with total solids content increased to 30% by reducing total water content to 320 g the resulting product was a firm, gritty gel with a viscosity in excess of 30,000 cps at 24° C.

D. 48% Solids

Using the procedure in A of this example with a larger batch size the solids content was increased to 48% by decreasing the proportion of water. The resulting product was a solid, rubbery mass. The viscosity was not measurable.

Of A through D, only the product produced at 16% solids could be considered to be liquid. On storage this product showed phase separation in less than one month demonstrating an unstable emulsion.

The terms and expressions used herein are descriptive and are not to be interpreted as limiting the invention or excluding any equivalent materials or procedures since it is recognized that modification or substitutions of the features described may be made within the scope of the claimed invention.

What is claimed is:

1. A stable aqueous polymeric dispersion comprised of at least 25% solids by weight of a graft copolymer of at least one vinyl monomer and a derivatized and thinned amylopectin starch with a degree of substitution of at least about 0.01 and an intrinsic viscosity of not less than about 0.12 dl/g wherein the starch/monomer ratio of the graft copolymer is less than about 100/25 by weight.

2. The dispersions of claim 1 wherein the derivatized and thinned amylopectin starch has a degree of substitution in the range from about 0.02 to about 0.4 and an intrinsic viscosity in the range from about 0.12 to about 0.28.

3. The dispersions of claim 1 wherein the starch has a degree of substitution in the range from about 0.06 to about 0.2 and an intrinsic viscosity in the range from about 0.13 to about 0.21.

4. The dispersions of claim 1, 2 or 3 wherein the polymeric dispersion is comprised of at least 40% solids by weight of the starch graft copolymer.

5. The dispersions of claim 1, 2 or 3 wherein the starch monomer ratio is from about 100/40 to about 100/200 by weight.

6. The dispersions of claim 1, 2 or 3 wherein the starch is waxy maize starch.

7. The dispersions of claim 4 wherein the starch monomer ratio is from about 100/40 to about 100/200 by weight.

8. The dispersions of claim 6 wherein the polymeric dispersion is comprised of at least 40% solids by weight.

9. The dispersions of claim 6 wherein the starch monomer ratio is from about 100/40 to about 100/200 by weight.

10. The dispersions of claim 9 wherein the polymeric dispersion is comprised of at least 40% solids by weight.

11. A stable aqueous polymeric dispersion comprised of at least 40% solids by weight of a starch graft copolymer of at least one vinyl monomer and a derivatized and thinned amylopectin starch with a degree of substitution in the range from about 0.06 to about 0.2 and an intrinsic viscosity in the range from about 0.13 dl/g to about 0.21 dl/g wherein the starch/monomer ratio is from about 100/40 to about 100/100 by weight.

12. The dispersions of claim 11 wherein the starch is waxy maize starch.

13. The dispersions of claim 12 wherein the starch graft copolymer is derived from a single vinyl monomer, said vinyl monomer being selected from the group consisting of acrylonitrile, vinyl acetate, methyl acrylate, ethyl acrylate, and methyl methacrylate.

14. The dispersions of claim 12 wherein the starch graft copolymer is derived from at least two vinyl monomers, said monomers being selected from the group consisting of methacrylic acid, ethyl acrylate, butyl acrylate, methyl methacrylate and diethylaminoethyl methacrylate.

15. The dispersions of claim 11, 12 or 13 wherein the substituent on the derivatized starch is a non-ionic substituent.

16. The dispersions of claim 11, 12 or 13 wherein the substituent on the derivatized starch is a cationic substituent.

17. The dispersions of claim 11, 12 or 13 wherein the substituent on the derivatized starch is selected from the group consisting of acetyl, hydroxyethyl, cyanoethyl, carbamylethyl and diethylaminoethyl substituents.

18. The process for producing a stable aqueous polymeric dispersion comprised of at least 25% solids by weight of a starch graft copolymer of at least one vinyl monomer and a derivatized and thinned amylopectin starch which comprises forming a derivatized and thinned amylopectin starch with a degree of substitution of at least about 0.01 and an intrinsic viscosity of not less than about 0.12 dl/g and forming a graft copolymer of said derivatized and thinned starch and at least one vinyl monomer by means of an initiator which acts to initiate graft copolymerization onto the starch to the substantial exclusion of the initiation of homopolymerization or copolymerization of said vinyl monomer(s) and wherein the starch/monomer ratio of the thinned and derivatized starch to the vinyl monomer(s) is less than about 100/25 by weight.

19. The process of claim 18 wherein the starch is waxy maize starch.

20. The process of claim 19 wherein the derivatized and thinned starch has a degree of substitution in the range from about 0.02 to about 0.4 and an intrinsic viscosity in the range from about 0.12 to about 0.28.

21. The process of claim 20 wherein the initiator is a Ce(IV) compound.

22. The process of claim 18, 19 or 20 wherein the starch after derivatization is in granular form.

23. The process of claim 22 wherein the dispersion is comprised of at least 40% by weight of the said starch graft copolymer and wherein the starch/monomer ratio of the thinned and derivatized starch to the vinyl monomer(s) is in the range from about 100/40 to about 100/200 by weight.

24. The process for producing a stable aqueous polymeric dispersion comprised of at least 40% solids by weight of a starch graft copolymer of at least one vinyl monomer and a derivatized and thinned amylopectin starch which comprises polymerizing at least one vinyl monomer with a derivatized and thinned amylopectin starch having a degree of substitution in the range from about 0.06 to about 0.2 and an intrinsic viscosity in the range from about 0.13 to 0.21 by means of a ceric ammonium nitrate initiator and wherein the starch/monomer ratio of the thinned and derivatized starch is in the range from about 100/40 to about 100/100.

25. The process of claim 24 wherein the starch is waxy maize starch.

26. The process of claim 24 or 25 wherein the thinned and derivatized starch has been produced by a process whereby the starch remains in granular form after the derivatization step.

27. The process of claim 24 or 25 wherein the thinned and derivatized starch has been produced by the sequential steps of forming a granular derivatized waxy maize starch followed by gelatinizing and thinning said starch.

28. The process of claim 26 wherein the starch has been thinned by enzymatic means.

29. The process of claim 26 wherein the starch graft copolymer is derived from a single vinyl monomer, said vinyl monomer being selected from the group consisting of acrylonitrile, vinyl acetate, methyl acrylate, ethyl acrylate and methyl methacrylate.

30. The process of claim 26 wherein the starch graft copolymer is derived from at least two vinyl monomers, said vinyl monomers being selected from the group consisting of methacrylic acid, ethyl acrylate, butyl acrylate, methyl methacrylate and dimethylaminoethyl methacrylate.

31. The process of claim 26 wherein the substituent on the derivatized starch is a non-ionic substituent.

32. The process of claim 26 wherein the substituent on the derivatized starch is a cationic substituent.

33. The process of claim 26 wherein the substituent on the derivatized starch is selected from the group consisting of acetyl, hydroxyethyl, cyanoethyl, carbamylethyl and diaminoethyl substituents.

34. The process of claim 27 wherein the substituent on the derivatized starch is a non-ionic substituent.

35. The process of claim 27 wherein the substituent on the derivatized starch is a cationic substituent.

36. The process of claim 27 wherein the substituent on the derivatized starch is selected from the group consisting of acetyl, hydroxethyl, cyanoethyl, carbamylethyl and diaminoethyl substituents.

* * * * *